United States Patent [19]
Agen

[11] 3,848,402
[45] Nov. 19, 1974

[54] SELF ADJUSTING HEDGE AND PIPE RAKE

[76] Inventor: Melbourne E. Agen, 248 Bunting Ln., Madison, Wis. 53704

[22] Filed: July 30, 1973

[21] Appl. No.: 383,602

[52] U.S. Cl. ............................................. 56/400.2
[51] Int. Cl. ............................................. A01d 7/06
[58] Field of Search......... 56/400.2, 400.19, 400.18, 56/400.17, 400.16, 400.20, 400.21, 400.08; 172/378

[56] References Cited
UNITED STATES PATENTS

| | | | |
|---|---|---|---|
| 1,925,357 | 9/1933 | Withington | 56/400.18 |
| 2,119,165 | 5/1938 | Hornstein | 56/400.21 |
| 2,738,214 | 3/1956 | Zimmers | 56/400.16 |
| 3,168,151 | 2/1965 | Kavanagh | 56/400.17 |

*Primary Examiner*—Antonio F. Guida
*Attorney, Agent, or Firm*—Keith Schoff

[57] ABSTRACT

A rake for cleaning and removing debris from confined places, i.e., between hedge rows, within drain pipe and the like, comprising tines pivotally mounted and movably disposed within guideway channels which converge toward the bottom and diverge toward the top so that the tines are gravity biased into a cluster when the rake is lifted and are deployed outward when the rake is operably placed on the ground thereby facilitating use in narrow spaces.

4 Claims, 3 Drawing Figures

PATENTED NOV 19 1974  3,848,402

SELF ADJUSTING HEDGE AND PIPE RAKE

BACKGROUND OF THE INVENTION

Adjustable width rakes and rakes having an adjustable position sleeve extending over the tines to adjust the spacing of the tines are known, the former requiring operator manipulation of set screws to adjust wing extensions to the rake head, and the latter requiring push-pull manipulation of the tine sleeve to make the adjustment. Such prior art devices require operator manipulation in addition to the normal manner of using a rake by lifting it and extending it and drawing it along the ground surface toward the operator: none provides a completely self-adjusting rake head as provided by the hereinafter described rake.

SUMMARY OF THE INVENTION

A self-adjusting, variable width rake head is provided for raking and cleaning around the base of individual shrubs and hedge plantings, the head being narrowed by lifting the rake and widened by drawing the rake along the ground so that the rake can be inserted easily between close plantings and the space between the stocks of the plants raked clean with minimum effort. In the rake of this invention a close tine cluster is provided when the rake is lifted by the tines being gravity biased into close adjacency and a fan-like deployment is provided by the rake head being dropped to the ground and drawn along the surface making the rake particularly useful for cleaning pipe and drain tile and raking hedge rows.

Any desired number of tines may be provided hinge mounted at the root and placed through guide channels so as to drop into convergence when the rake is raised and be divergently biased when the rake head is placed on the ground and drawn toward the operator. The rake head is thus self-adjusting, being insertable into narrow and confined spaces and spreading until it contacts the pipe walls or plant stocks among which it is placed and scours them clean of debris.

DESCRIPTION OF THE INVENTION

Figure 1:
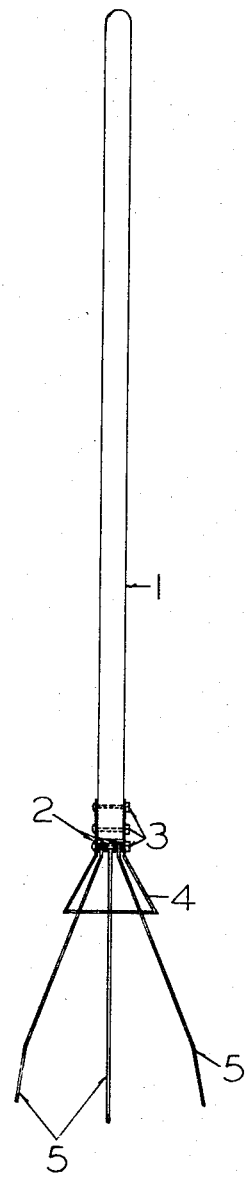
FIG. 1 is a front elevation of a rake of this invention shown in upstanding position.
Figure 2:
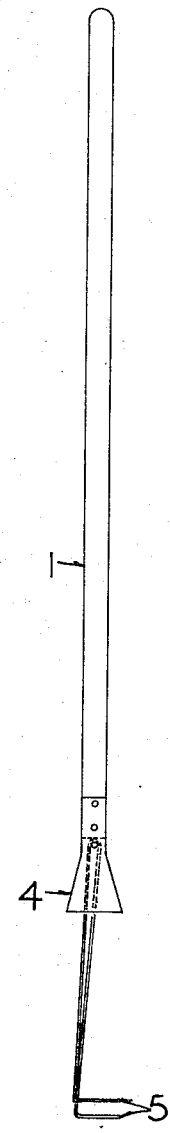
FIG. 2 is a side elevation of the rake of FIG. 1.
Figure 3:
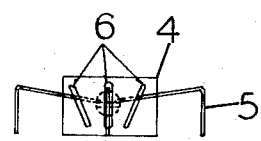

FIG. 3 is a bottomview of the rake of FIG. 1. In the figures rake handle 1 is shown fixedly attached to rake guide head 4 by transverse bolts 3, the lowermost of the three bolts shown providing a hinge pin upon which the root ends of tines 5 are operably retained separated by spacers 2 disposed in alternate arrangement with the tines on the bolt. The root ends of tines 5 are configured with a eye opening through which lowermost bolt 3 is inserted thereby pivotally mounting the tines on the bolt without rigidly restraining movement of the tines on the bolt except as provided by spacers 2. Tines 5 can thus move slightly askew of the planes in which they are mounted to enable the rake head to expand in width in operable manner. If desired, however, tines 5 may be provided with close fitting bushings which retain radial alignment of the tines with the lowermost bolt 3 thereby requiring the tines to be forcibly biased against spring pressure of the tines into expanded deployment and require the rake head to be actively forced downward against the ground or underlying surface to be operably spread.

Rake guide head 4 is rigidly secured to handle 1 and is configured with a series of elongated slots 6, one slot being provided for each tine 5, which are disposed with the lower ends of the slots closely converging and the upper ends divergent as shown in FIG. 3. Slots 6 serve as guide channels for tines 5 guiding the tines into closely spaced nearly parallel arrangement when the rake is raised from the ground and extended in preparation for being placed down and drawn to the operator. Tines 5 drop by gravity actuation to the bottoms of slots 6 into a closely grouped cluster until the weight of the rake head is bourne by the ground whereupon guide head 4 drops until the upper end extremities of slots 6 rest upon tines 5 causing the tines to be deployed laterally in fan-like fashion. When so deployed the depending finger-configured free end extremities of tines 5 are spread until the stock of plants or the like being raked is encountered enabling the intermediate space to be raked clean. When the rake is lifted, tines 5 drop into a cluster enabling the rake to be easily withdrawn from closely spaced overhanging plants for the stroke to be repeated.

Tines 5 preferably comprise spring wire for use in raking sturdy growth such as hedges or for scouring drain pipe or eavestrough downspout and the like, and preferably comprise less firm material such as bamboo if grass or other tender growth is to be raked, but in either case the performance of the rake will be similar Any number of tines as may be desired can be provided and any operable pivotal arrangement may be provided at the root end of the tines including spring loading to require positive downward pressure to be exerted on the rake head to deploy the tines, either in the manner hereinabove described or by use of helical spring loading anchored against guide head 4 in a manner well known for spring tooth rakes, but in each instance non-parallel slots 6 are provided to spread and widen the sweep of the rake when drawn along the ground surface from that when the rake is raised above the ground.

I claim:

1. A self-adjusting rake for use in confined spaces comprising in combination
   a. a handle,
   b. a guide head fixed to said handle and configured with a plurality of elongated slots disposed therein which extend through an elevational gradient when said rake is operably positioned for use with the lower end extremities of said slots disposed in nearer mutual adjacency than the upper end extremities thereof,
   c. a plurality of tines disposed closely clustered and pivotally affixed at their root ends essentially as extension of said handle to said guide head wherein each said tine has a vertical component of movement when said rake is operably positioned for use, each said tine being disposed separately within one of said slots, said tines being actuated to drop to the lower end extremities of said slots when said rake is raised thereby to be closely clustered along their entire length when said rake is unsupported except by said handle, and to be divergently biased by said guide head being biased downward relative to said tines when said tines are placed down and drawn along a surface being raked, thereby causing said tines to be disposed at the upper end extremities of said slots.

2. The article of claim 1 wherein spaces are provided intermediate said tines.

3. The article of claim 1 wherein said tine actuation is by gravity.

4. The article of claim 1 wherein said guide head biasing is by gravity.

* * * * *